No. 667,758. Patented Feb. 12, 1901.
W. R. ALLEN.
NUT LOCK.
(Application filed Dec. 22, 1900.)
(No Model.)

Witnesses
Fred E. Maynard
H. J. Shepard

W. R. Allen, Inventor.
by C. A. Snow & Co.
Attorneys

UNITED STATES PATENT OFFICE.

WILLIAM R. ALLEN, OF HOQUIAM, WASHINGTON.

NUT-LOCK.

SPECIFICATION forming part of Letters Patent No. 667,758, dated February 12, 1901.

Application filed December 22, 1900. Serial No. 40,789. (No model.)

*To all whom it may concern:*

Be it known that I, WILLIAM R. ALLEN, a citizen of the United States, residing at Hoquiam, in the county of Chehalis and State of Washington, have invented a new and useful Nut-Lock, of which the following is a specification.

This invention relates to nut-locks, and more particularly to that class of devices which employ a locking-washer, and has for its object to provide an improved interlocking engagement between the washer and the nut, whereby these parts may be conveniently and effectively interlocked and also readily disconnected, so as to permit of the removal of the nut from the bolt. It is furthermore designed to permit of a free and unrestrained screwing of the nut upon the bolt and to provide for a positive interlock of the members, so as to prevent accidental looseness or displacement by jarring movements and wear.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

Figure 1:
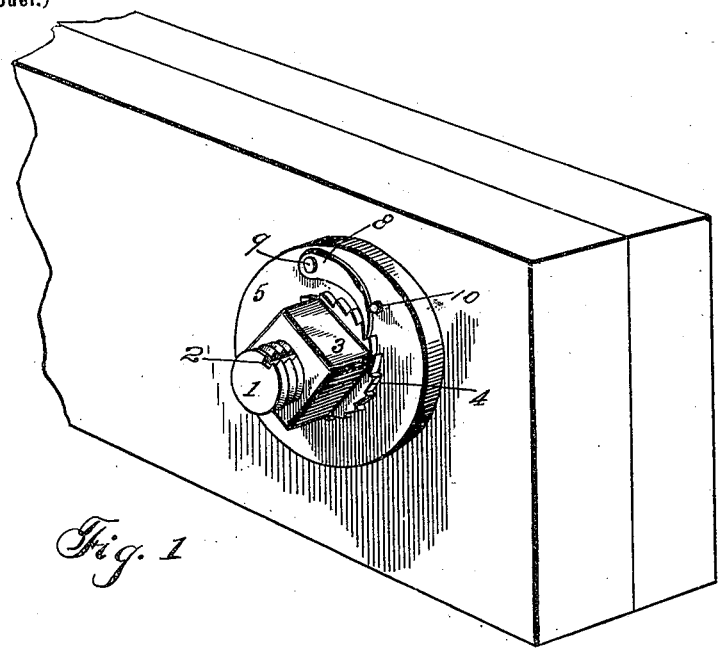
Figures 2, 3:
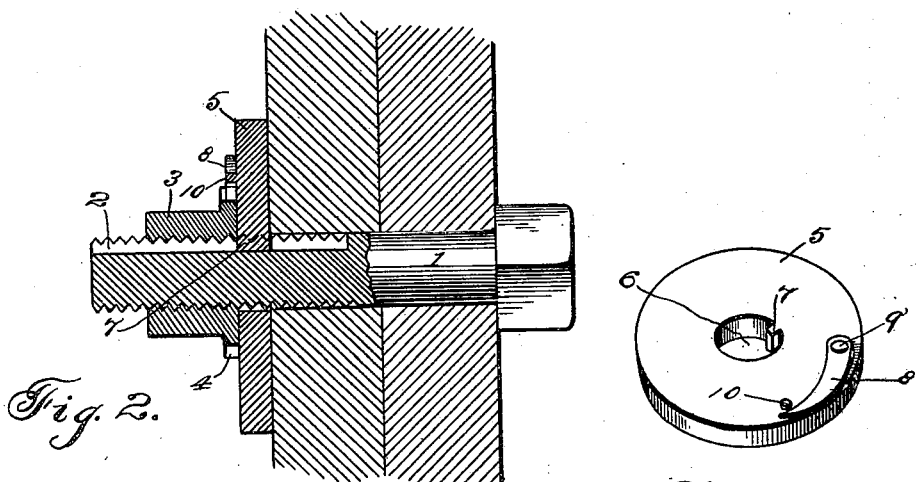

In the drawings, Figure 1 is a perspective view of a bolt and nut having the present invention applied thereto. Fig. 2 is a central longitudinal sectional view thereof. Fig. 3 is a detail perspective view of the locking-washer.

Like characters of reference designate corresponding parts in all of the figures of the drawings.

Referring to the drawings, 1 designates an ordinary screw-threaded bolt having the longitudinal groove 2 formed in one side thereof and extending for the entire length of the screw-threaded portion thereof. The nut 3 is fitted to the bolt in the usual manner and at its inner end is provided with an outwardly-directed circular marginal ratchet or toothed flange 4.

For locking the nut against accidental motion there is provided the locking-washer 5, of any desired shape, having the central bolt-opening 6 for the loose reception of the bolt and the lug or projection 7, projecting inwardly from the marginal edge of the opening and designed to take into the groove of the bolt, as clearly illustrated in Fig. 2 of the drawings. It will be understood that the washer is placed upon the bolt prior to the nut and is set flat against the adjacent surface to which the nut is to be applied. Upon the outer side of the washer and adjacent to the outer edge thereof there is provided a locking-dog 8, which has one end connected to the washer by means of a suitable pivot 9, while its opposite free end is tapered to a point, so as to take into the notched peripheral edge of the nut, and thereby lock the latter against accidental turning upon the bolt.

In the locked position of the dog, as shown in Fig. 1 of the drawings, the outer longitudinal edge thereof is in direct contact with a stop projection or shoulder 10, formed upon the outer face of the washer and arranged adjacent to the free end of the dog, so as to prevent looseness or accidental disengagement of the dog when in its locked position. To release the nut, it is merely necessary to insert some pointed instrument—as, for instance, the blade of a knife—beneath the dog, so as to spring the same laterally outward and out of engagement with the stop projection, when said dog is free to be swung backwardly or outwardly out of engagement with the nut to free the latter and permit of it being unscrewed. When not in use, the dog is disposed at the outer side of the stop projection, against which it rests, so as to be held out of engagement with the nut when the latter is being screwed upon the bolt, and is sprung or snapped over the outer end of the projection and into engagement with the notched peripheral edge of the nut when adjusted to its locked position. Thus the stud or projection holds the free end of the dog in its locked and unlocked positions, and the dog is designed to be sprung over the end of the stud in opposite directions to lock and free the nut. By having the dog in direct contact with the stop projection and the free extremity of the dog snugly within one of the notches or against a tooth of the nut there can be no looseness of the dog, and therefore jarring movements will not displace the dog, and there is no wear thereon.

What is claimed is—

1. In a nut-lock, the combination with a bolt, and a nut, of a non-rotatable washer, having a locking-dog arranged in locked relation with respect to the nut, and a stop projection carried by the washer and in engagement with the outer edge of the dog in the locked position thereof, the dog being capable of being sprung over the outer end of the stop projection.

2. In a nut-lock, the combination with a bolt, and a nut, of a non-rotatable element, having a nut-locking dog, and a stop projection in locked engagement with the dog, the latter being capable of being sprung in opposite directions over the outer end of the stop projection.

3. In a nut-lock, the combination with a bolt, having a longitudinal groove, and a nut, having a marginal toothed flange, of a locking-washer, having a bolt-opening, a projection or shoulder upon the marginal edge of the opening and received within the groove of the bolt, a locking-dog mounted upon the outer face of the washer and having its free end arranged in locked relation to the toothed flange of the nut, and a stop projection carried by the outer face of the washer and arranged in direct contact with the outer longitudinal edge of the dog, whereby the latter is rigidly held in engagement with the nut, said dog being capable of being sprung in opposite directions over the outer end of the stop projection to lock and unlock the nut.

4. A non-rotatable nut-locking washer, having a lateral stop projection located within the marginal edge of the washer, and a nut-locking dog mounted upon the same face of the washer as is the stop projection, and having its outer longitudinal edge in direct contact with the inner side of the stop projection when in its locked position, said dog being capable of being sprung in opposite directions over the outer end of the stop projection.

In testimony that I claim the foregoing as my own I have hereto affixed my signature in the presence of two witnesses.

WILLIAM R. ALLEN.

Witnesses:
CHAS. E. BEACH,
MATT KELLEY.